(12) United States Patent
Yang et al.

(10) Patent No.: US 11,974,377 B2
(45) Date of Patent: Apr. 30, 2024

(54) SYSTEM AND METHOD FOR NIGHTTIME LIGHTING CONTROL AND DANGER MONITORING AND ALARMING

(71) Applicants: TIANJIN CHENGJIAN UNIVERSITY, Tianjin (CN); XI'AN UNIVERSITY OF ARCHITECTURE AND TECHNOLOGY, Xi'an (CN)

(72) Inventors: Bin Yang, Tianjin (CN); Pengju Liu, Tianjin (CN); Yihang Liu, Tianjin (CN); Dacheng Jin, Tianjin (CN); Bingan Pan, Tianjin (CN); Pengfei Yang, Tianjin (CN)

(73) Assignees: TIANJIN CHENGJIAN UNIVERSITY, Tianjin (CN); XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 129 days.

(21) Appl. No.: 17/897,004

(22) Filed: Aug. 26, 2022

(65) Prior Publication Data

US 2023/0217572 A1 Jul. 6, 2023

(30) Foreign Application Priority Data

Jan. 4, 2022 (CN) .......................... 202210004994.9

(51) Int. Cl.
*H05B 47/12* (2020.01)
*G10L 15/22* (2006.01)

(52) U.S. Cl.
CPC .............. *H05B 47/12* (2020.01); *G10L 15/22* (2013.01); *G10L 2015/223* (2013.01)

(58) Field of Classification Search
CPC .... H05B 47/12; H05B 47/125; H05B 47/105; H05B 47/13; G10L 15/22; G10L 2015/223; Y02B 20/40; G08B 3/10
USPC ........................................................ 315/291
See application file for complete search history.

(56) References Cited

U.S. PATENT DOCUMENTS

| | | | |
|---|---|---|---|
| 11,614,723 B2* | 3/2023 | Yang ..................... | G05B 19/042 700/276 |
| 11,762,477 B2* | 9/2023 | Yang ....................... | G06F 3/017 715/863 |
| 2023/0217572 A1* | 7/2023 | Yang .................... | H05B 47/125 315/291 |

* cited by examiner

*Primary Examiner* — Ryan Jager
(74) *Attorney, Agent, or Firm* — Zhigang Ma

(57) ABSTRACT

A system and method for nighttime lighting control and danger monitoring and alarming are provided. The system includes a data acquisition system, an information processing system, and a terminal control system. The data acquisition system is configured to acquire video information in a room and a voice content of a person in the room, and transmit the video information and the voice content to the information processing system; the information processing system is configured to obtain voice command information based on the voice content and age information and safety state information of the person based on the video information, and transmit the voice command information, the age information and the safety state information to the terminal control system; and the terminal control system is configured to control a terminal lighting fixture, and perform capturing of an image of the person and perform voice alarming according to the safety state information.

9 Claims, 3 Drawing Sheets

SYSTEM AND METHOD FOR NIGHTTIME LIGHTING CONTROL AND DANGER MONITORING AND ALARMING

TECHNICAL FIELD

The present disclosure relates to the field of control and monitoring, and in particularly to a system for nighttime lighting control and danger monitoring and alarming and a method for nighttime lighting control and danger monitoring and alarming.

DESCRIPTION OF RELATED ART

Behaviors of persons of getting up and urinating at night are called "getting up in the night to urinate". The persons often turn on lamps at first when getting up in the night to urinate, however, they are often fuzzy-headed when they just wake up at night, and thus it is difficult for them to find positions of switches of the lamps accurately. Further, a frequency of getting up in the night to urinate for elderly people and children is more than that of the adults; and due to a poor eyesight and inconvenient physical activities of the elderly people and a small age of the children, it is not easy for them to turn on the lamps accurately in the dark night, especially when the positions of the switches of the lamps are far from a sleeping region, and thus a safety accident, for example, they are tripped and bumped by tables or chairs may occur. Furthermore, a demand for lighting during getting up in the night to urinate is different from that during activities at night, a brightness of the lighting during getting up in the night to urinate merely needs to ensure that the persons can see the road clearly. As researchers at the University of Leicester in England found, the lamps are suddenly turned on with strong lighting during getting up in the night to urinate or the persons in dark places are suddenly exposed to strong lighting that will affect sensitive physiological clocks of the persons. Because the sudden strong lighting will irritate eyes and brains of the persons, cause a kind of "light pressure" on bodies of the persons, affects normal metabolic functions of the bodies including normal physiological and biochemical reactions, and even make heartbeat, pulse and blood pressure of the persons abnormal, and thus affect mental conditions of the persons and affect falling asleep again of the persons, which is very unfriendly for persons who need to work during the day and the elderly people who cannot easily fall asleep. Moreover, persons of different ages have different requirements for the brightness of the lighting during getting up in the night to urinate. Therefore, if "the terminal lighting fixture being turned on intelligently" and "the lighting being provided on-demand" can be achieved, not only sleep of the persons at night is affected, but also energy can be saved potentially.

In existing methods, intelligent induction lamps are mainly used to control the lighting during getting up in the night to urinate, and principles thereof are to use infrared sensors to identify persons. However, a low accuracy of this identification manner can easily lead to an error decision. For example, when there are pets in a room, it will cause a wrong turning-on of a lamp. Moreover, this control manner cannot control brightness of the lamps according to an age range, and lighting requirements of the persons of different ages cannot be met.

SUMMARY

In order to solve the problems existing in the related art, the present disclosure provides a system for nighttime lighting control and danger monitoring and alarming and a method for nighttime lighting control and danger monitoring and alarming, which utilizes image processing technology to determine an age group of a person, and determines a sleeping state of the person by identifying posture information and position information of the person, and transmits the obtained information to a terminal control system to control a linkage and an operation mode of a terminal lighting fixture. Further, the image recognition technology can also be used to identify a danger of falling down at night and thus an alarm is output in time.

In order to achieve the above objective, the present disclosure provides a system for nighttime lighting control and danger monitoring and alarming, which includes: a data acquisition system, an information processing system, and a terminal control system; where the data acquisition system is configured to acquire video information in a room and a voice content of a person in the room in real-time, and transmit the video information and the voice content to the information processing system; the information processing system is configured to obtain voice command information of the person based on the voice content, obtain age information and safety state information of the person based on the video information, and transmit the voice command information, the age information and the safety state information to the terminal control system; and the terminal control system is configured to intelligently control a terminal lighting fixture according to the voice command information and the age information, and perform capturing of an image of the person and perform voice alarming according to the safety state information.

In an embodiment of the present disclosure, the data acquisition system may include an infrared camera device and a voice acquisition device, the infrared camera device and the voice acquisition device are both arranged at tops of the room, the infrared camera device is configured to obtain the video information in the room in real-time and transmit the video information to the information processing system, and the voice acquisition device is configured to acquire the voice content of the person and transmit the voice content to the information processing system.

In an embodiment of the present disclosure, the information processing system may include an object detection device, a posture recognition device, a voice command processing device, and a safety recognition device; the object detection device is configured to: detect position information of the person and the age information of the person, determine light intensity level information of the terminal lighting fixture according to the age information of the person, and transmit the light intensity level information to the terminal control system; the posture recognition device is configured to recognize posture information of the person, and the posture information is one of a lying posture and a non-lying posture, and the non-lying posture is one of a sitting posture and a standing posture; the voice command processing device is configured to receive the voice content acquired by the voice acquisition device and process the voice content through a deep learning algorithm to obtain the voice command information and thereby perform terminal control; and the safety recognition device is configured to obtain the safety state information according to the positon information of the person detected by the object detection device and the posture information of the person recognized by the posture recognition device, and transmit the safety state information to the terminal control system.

In an embodiment of the present disclosure, the object detection device is configured to extract a facial region of the person in the room, and estimate an age group to which the person belongs through an open source computer vision library (OpenCV) algorithm based on deep learning as the age information; where the age group corresponds to one of the following three categories: children group which is smaller than or equal to 15 years old; young and middle-aged group which is between 16 years old and 60 years old, and elderly group which is equal to or more than 61 years old.

In an embodiment of the present disclosure, the posture recognition device is configured to recognize the posture information of the person in the room through an OpenCV based skeleton key point algorithm In an embodiment of the present disclosure, the position information of the person is one of a sleeping region and a non-sleeping region; where the safety recognition device is configured to obtain safety state information of the person as follows: recognize the person is at a safety state as the safety state information, when the person is in the sleeping region and the posture information of the person is the lying posture; recognize the person is at a safety state as the safety state information, when the person is in the sleeping region and the posture information of the person is the non-lying posture; recognize the person is at a safety state as the safety state information, when the person is in the non-sleeping region and the posture information of the person is the non-lying posture; recognize the person is at a dangerous state as the safety state information, when the person is in the non-sleeping region and the posture information of the person is the lying posture In an embodiment of the present disclosure, the terminal control system may include a light intensity adjusting device, an image capturing device, and a voice broadcasting device; the light intensity adjusting device is configured to receive the light intensity level information from the information processing system, and control the lighting fixture to be with a corresponding light intensity level according to the light intensity level information; the image capturing device is configured to receive the safety state information of the person, perform the capturing of the image of the person in response to the safety state information of the person indicating "the person is in danger", and transmit the captured image to a mobile phone of a family member of the person as a reminder; and the voice broadcasting device is configured to receive the voice command information of the person transmitted from the information processing system and respond to the voice command information, and receive the safety state information of the person and perform the voice alarming in response to the safety state information of the person indicating "the person is in danger".

In an embodiment of the present disclosure, the light intensity adjusting device has five levels, which includes: a closed-level, an operated-level corresponding to a light intensity in a range of 50 luxes (LX) to 300 LX, a children-mode-level corresponding to a light intensity greater than 0 and smaller than or equal to 10 LX, a night-standard-mode-level corresponding to a light intensity in a range of 2 LX to 4 LX, and an elderly-mode-level corresponding to a light intensity in a range of 10 LX to 20 LX; and the age information matches with one of the five levels of the light intensity adjusting device.

A method for nighttime lighting control and danger monitoring and alarming is provided according to an embodiment of the present disclose, which includes: S1, acquiring video information in a room and a voice content of a person in the room, obtaining position information, posture information and age information of the person in the room according to the video information, and processing the voice content to obtain voice command information to thereby control a terminal lighting fixture; S2, determining light intensity level information of the terminal lighting fixture according to the age information of the person in the room, and controlling a level of the terminal lighting fixture according to the light intensity level information; S3, determining whether the person in the room is in a state of getting up in the night to urinate according to the position information and the posture information of the person in the room, wherein the state of getting up in the night to urinate is one of the group consisting of: person leaving a sleeping region and entering a non-sleeping region, person leaving a non-sleeping region and entering a toilet, person leaving the toilet and entering the non-sleeping region, and person leaving the non-sleeping region and entering the sleeping region; and S4, determining the person is at a dangerous state in response to the person in the room being in the state of getting up in the night to urinate, the person being in the non-sleeping region and the posture information of the person indicating a lying posture, obtaining an image of the person at the dangerous state and performing voice alarming.

Compared with the related art, the present disclosure has at least the following beneficial effects.

The present disclosure provides the system for nighttime lighting control and danger monitoring and alarming, which uses the data acquisition system to identify the video information in the room, and identifies various instructions from the person in the room, and the information processing system obtains the age information of the person, and the terminal control system, according to the voice command information and the age information of the person, intelligently control the terminal lighting fixture to create a comfortable lighting environment for the person when the person is getting up in the night to urinate. Further, the information processing system can also obtain the safety state information of the person in the room, such that the dangerous state of the person can be found in time and an alarm can be output in time.

Compared with a traditional on-off mode of the terminal lighting fixture by manual, the system for nighttime lighting control and danger monitoring and alarming can intelligently control the terminal lamp, which is more intelligent and humanized. Compared with an existing sensing lighting control system, the system for nighttime lighting control and danger monitoring and alarming of the present disclosure obtains the video information in the room in real-time through the infrared camera device, and accurately recognizes the position information and the posture of indoor people through the object detection device and the posture recognition device, so that the accurate control of the terminal lighting fixture can be achieved and a phenomenon that a sensor is affected by a pet in the room to obtain a false determination result for the existing sensing lighting control system does not occur. The present disclosure can not only achieve intelligent lighting, but also can determine safety state information of the person at night as a reminder in time.

For the system for nighttime lighting control and danger monitoring and alarming, the age group of the person in the room can be obtained through the object detection device, and the level of the light intensity adjusting device is adjusted according to the age group, so that the age group is matched with a corresponding light intensity, and "light supply on demand" is realized, and the sleeping of the person is minimally affected while alighting requirement are met.

Figure 1:
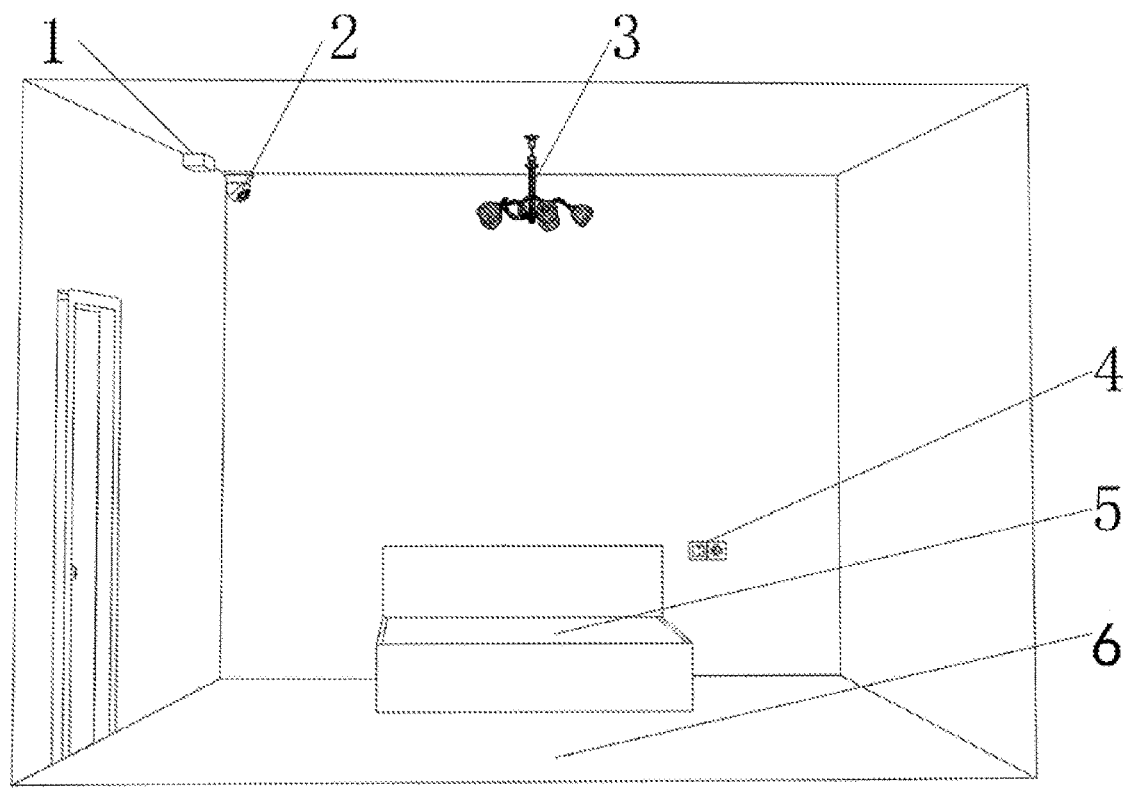
FIG. 1 illustrates a schematic view of an installation position of a system for nighttime lighting control and danger monitoring and alarming according to an embodiment of the present disclosure.

Reference numerals are as follows: 1—voice acquisition device, 2—infrared camera, 3—terminal lighting fixture, 4—lighting mode adjusting device, 5—sleeping region, 6—non-sleeping region.

DETAILED DESCRIPTION OF EMBODIMENTS

The present disclosure will be further explained in combination with accompanying drawings and specific embodiments.

As shown in FIG. 1, a system for nighttime lighting control and danger monitoring and alarming based on computer vision is provided according to an embodiment of the present disclosure, which may include: a data acquisition system, an information processing system and a terminal control system.

1. Data Acquisition System

The data acquisition system is configured to acquire video information in a room and a voice content of a person in the room.

The data acquisition system may include an infrared camera device and a voice acquisition device 1. Specifically, the infrared camera device is an infrared camera 2, which is arranged at a top of the room, and configured to acquire the video information of the room (for example, in a bedroom) in real-time, and transmit a video stream including the video information to the information processing system through a home wireless fidelity (WIFI) network to provide data for the information processing system.

The voice acquisition device 1 is arranged at a top of the room, configured to acquire a voice content of the person, and transmit the voice content of the person to an instruction processing device of the information processing system through the home WiFi to recognize and output voice command information of the person.

2. Information Processing System

The information processing system includes an object detection device (recognizing position information of the person), a posture recognition device (recognizing posture information the person), a voice command processing device (recognizing the voice command information of the person and controlling the terminal control system), and a safety recognition device (recognizing safety state information of the person at night according the positon information and the posture information the person).

2.1 The object detection device is configured to detect the position information of the person in real-time; and determine an age group to which the person belongs, and obtain light intensity level information according to the age group.

Figure 4:
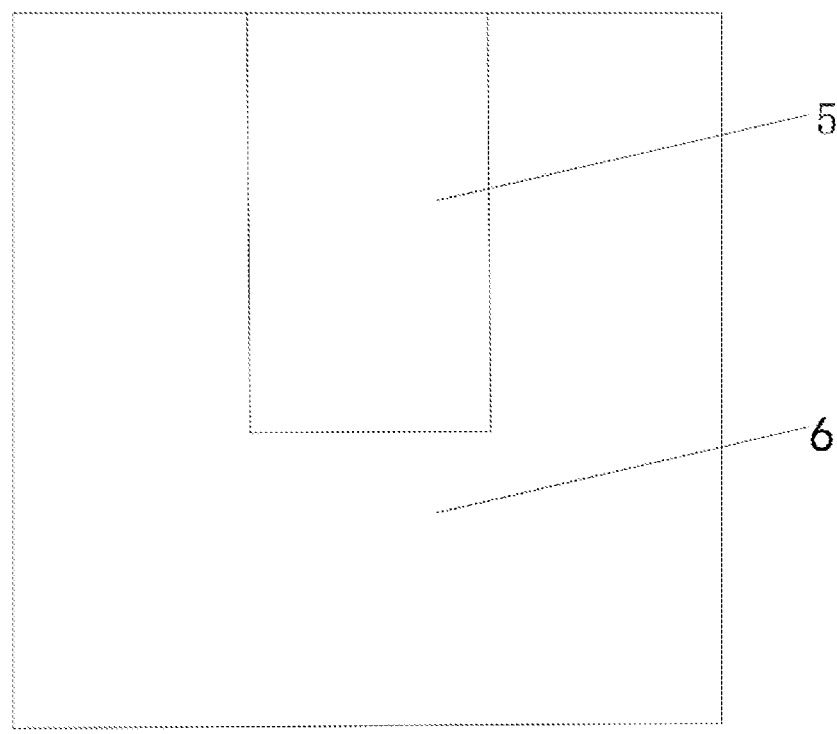
FIG. 4 illustrates a top view of divided regions of a room.

As shown in FIG. 4, according to the present disclosure, the room is divided into a sleeping region 5 and a non-sleeping region 6. The object detection device is configured to, through an object detection algorithm such as a YOLOv5 model, detect whether a person is in the room and determine the position information of the person in the room in real-time.

The object detection device is configured to extract a facial region of the person in the room, and estimate an age group of the person through an open source computer vision library (OpenCV) algorithm based on deep learning. Referring to a new age group dividing manner of the United Nations World Health Organization, people are divided into following three categories according age groups: children group which is smaller than or equal to 15 years old; young and middle-aged group which is between 16 years old and 60 years old, and elderly group which is equal to or more than 61 years old. Further, the object detection device is configured to determine, according to the age group of the person in the room, light intensity level information of a terminal lighting fixture in the room when the terminal lighting fixture are turned on.

2.2 The posture recognition device is configured to recognize posture information the person in the room.

In a preferred embodiment, the posture recognition device is configured to recognize the posture information of the person in the room through an OpenCV based skeleton key point algorithm. The posture information is a lying posture or a non-lying posture, and the non-lying posture is a sitting posture or a standing posture.

Figure 2:
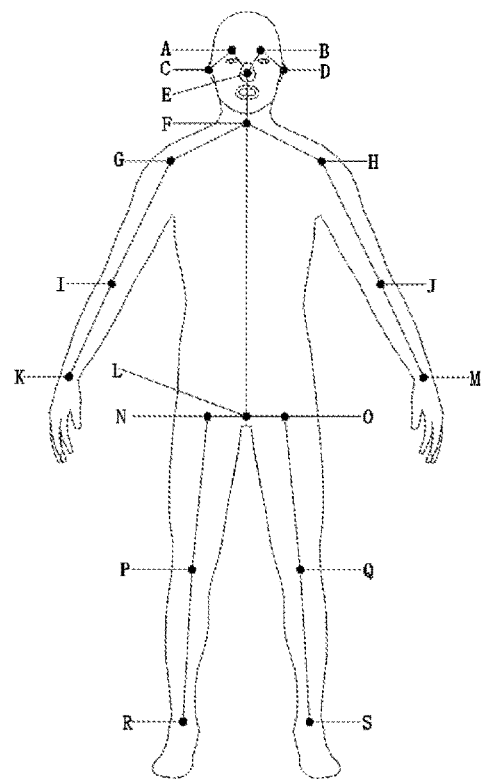
FIG. 2 illustrates a schematic view of key points of human bones.

As shown in FIG. 2, a total number of skeleton key points selected by the OpenCV based skeleton key point algorithm is 19, the skeleton key points are specifically indicated as follows: A—right eye, B—left eye, C—right ear, D—left ear, E—nose, F—neck, G—right shoulder, H—left shoulder, I—right elbow, J—left elbow, K—right wrist, L—center of buttock, M—left wrist, N—right buttock, O—left buttock, P—right knee, Q—left knee, R—right ankle, S—left ankle.

2.3 The voice command processing device is configured to recognize and output voice command information.

In a preferred embodiment, the voice command processing device is further configured to recognize the voice content of the person acquired by the voice acquisition device 1 through a semantic recognition algorithm, and process the voice content of the person through a deep learning algorithm to obtain the voice command information of the person. The voice command processing device can further directly perform terminal control according to the recognized voice command information of the person.

2.4 Safety Recognition Device

The object detection device and the posture recognition device transmit respectively the position information and the posture information the person in the room at night to the safety recognition device, and the safety recognition device recognizes safety state information of the person at night according to the positon information and the posture information of the person. Specifically, the safety recognition device is configured to obtain the safety state information of the person as follows: recognize the person is at a safety state as the safety state information, when the person is in the sleeping region and the posture information of the person is the lying posture; recognize the person is at a safety state as the safety state information, when the person is in the sleeping region and the posture information of the person is the non-lying posture; recognize the person is at a safety state as the safety state information, when the person is in the non-sleeping region and the posture information of the person is the non-lying posture; recognize the person is at a dangerous state as the safety state information, when the person is in the non-sleeping region and the posture information of the person is the lying posture.

The safety recognition device is configured to transmit the safety state information of the person at night to the terminal control system.

3 The terminal control system may include a light intensity adjusting device, an image capturing device, and a voice broadcasting device.

The terminal control system is configured to obtain the light intensity level information, the position information of the person and the safety state information of the person, and control terminal devices (e.g., the terminal lighting fixture 3).

3.1 Light Intensity Adjusting Device

The light intensity adjusting device is configured to receive the light intensity level information from the information processing system, and control the lighting fixture to be with a corresponding light intensity level according to the light intensity level information.

Figure 3:
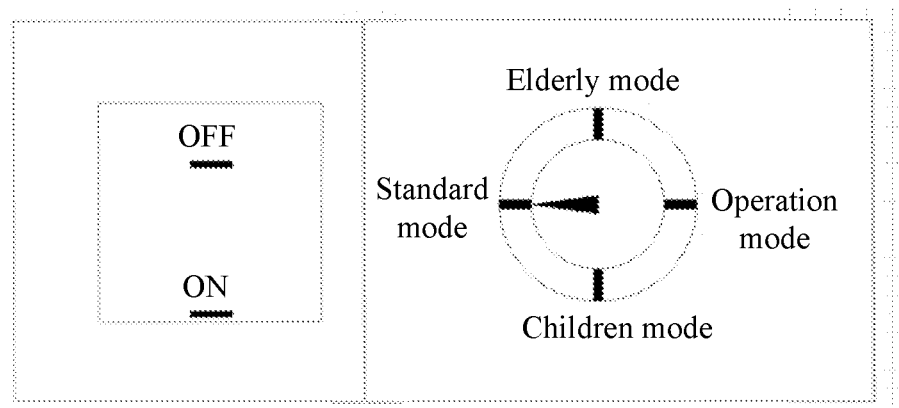
FIG. 3 illustrates a schematic view of a lighting mode adjusting device according to an embodiment of the present disclosure.

Preferably, as shown in table 1, the light intensity adjusting device specifically refers to two multi-level controllers for coordinately controlling lighting fixtures in the room and a toilet. The light intensity adjusting device has five levels, namely a closed-level, an operated-level (a corresponding light intensity is in a range of 50 luxes (LX) to 300 LX, Lux is the unit of illumination), a children-mode-level (a corresponding light intensity is greater than 0 and smaller than or equal to 10 LX), a night-standard-mode-level (a corresponding light intensity is in a range of 2 LX to 4 LX), and an elderly-mode-level (a corresponding light intensity is in a range of 10 LX to 20 LX). Specifically, the operated-level corresponds to a situation of normal illumination; and is not for a state of getting up in the night to urinate and is not related to the age group, but it is indispensable with respect for such as the demand for light during daytime or night work. A manual lighting mode adjusting device is shown in FIG. 3.

TABLE 1

Level information of the light intensity adjusting device

| Type of getting up in the night to urinate | Level information of the light intensity adjusting device |
|---|---|
| children getting up in the night to urinate | children-mode-level (0-10 LX) |
| young and middle-aged people getting up in the night to urinate | night-standard-mode-level (2-4 LX) |
| elderly people getting up in the night to urinate | elderly-mode-level (10-20 LX) |

3.2 Image Capturing Device

In response to the safety state information of the person indicating "the person is in danger", the image capturing device is configured to obtain the position information of the person in the room, capture an image of the person based the video information, and transmit the position information and the captured image to a mobile phone of a family member of the person through the home WIFI as a reminder.

3.3 The voice broadcasting device is configured to correspond to the voice command information of the person and perform the voice alarming in case of the dangerous state. For example, the voice broadcasting device may be a loudspeaker.

The voice broadcasting device is conjured to receive the voice command information transmitted by the voice acquisition device 1, and broadcast a voice response to the instruction information of the person.

The voice broadcasting device may be connected with the home WIFI, and may be used as an intelligent audio. When the safety recognition device recognizes that the person in the room is in the dangerous state, the voice broadcasting device receives the safety state information, i.e., the dangerous state and broadcasts the dangerous state as a reminder.

It should be noted that, in some embodiments, the object detection device, the posture recognition device, the voice command processing device, the safety recognition device, the image capturing device, and the voice broadcasting device described above may be implemented/embodied by one or more memories stored software modules therein and one or more processors coupled to the one or more memories and configured to execute the software modules.

4 Description for the Present Disclosure

The present disclosure is mainly aimed at an object at night. Since and switching of operation modes of the infrared camera will be influenced by indoor light, when the object detection device detects that the person is in the sleeping region, the posture recognition device detects that the person's posture is "lying posture", and the terminal lighting fixture 3 is turned off for the first time, it is determined that the person is in a sleeping stage, and the whole system is in a night operation mode. From then until 7:00 a.m. of the next day, the turned on and turned off of the terminal lighting fixture are intelligently controlled by the system.

A method for nighttime lighting control and danger monitoring and alarming is provided according to the present disclosure, which is described as follows.

The data acquisition system and the information processing system are automatically turned on at 19:00 every day. The data acquisition system acquires video information in the room for example bedroom in real-time, and transmits the video information to the information processing system through the home WiFi.

A voice command information is transmitted between the information processing system and the terminal control system through the home WiFi. When the system for nighttime lighting control and danger monitoring and alarming of the present disclosure is in a night operation mode, the information processing system transmits the voice command information through the home WiFi to the terminal control system for controlling turned-on of the terminal control system.

After the data acquisition system and the information processing system are turned on, the infrared camera of the data acquisition system transmits video information shoot in real-time to the information processing system through the home WiFi, and the posture recognition device of the information processing system detects the posture information the person through the skeleton key point algorithm.

If the posture recognition device of the information processing system detects that the posture information the person is the lying posture, the object detection device of the information processing system further determines the position information of the person through the YOLOv5 algorithm. The information processing system transmit voice command information through the home WIFI to the terminal control system to control the terminal lighting fixture to be turned off if it is determined by the object detection device that the person is in the sleeping region.

If the object detection device determines that the person is in the non-sleeping region 6, the object detection device positions the person and obtains position information of the person, and the information processing system sends the position information to the terminal control system. The image capturing device of the terminal control system obtains image information indicating a falling down state of the person according to the position information, and sends the image information to the mobile phone of the family member of the person through the home WIFI; and the voice broadcasting device outputs a voice alarming to remind the family member of the person. When the posture recognition device determines that the posture information the person is in the non-lying posture and the object detection device detects that the person is in the sleeping region, which is defined as the state of getting up in the night to urinate, the object detection device estimates the age group of the person with the non-lying posture through the OpenCV algorithm based on deep learning, the information processing system transmits the age group of the person to the light intensity adjusting device of the terminal control system through the home WIFI, and the light intensity adjusting device controls the terminal lighting fixture to be turned on in a lighting mode matched with the age group to thereby meet the lighting requirements of the person when getting up in the night to urinate.

Specifically, a state of getting up in the night to urinate is divided into the following stages, including: person leaving the sleeping region 5 and entering the non-sleeping region 6, person leaving the non-sleeping region 6 and entering a toilet; person leaving the toilet and entering the non-sleeping region 6, and person leaving the non-sleeping region 6 and entering the sleeping region 5.

During getting up in the night to urinate, when the person is in the stage of person leaving the sleeping region 5 and entering the non-sleeping region 6, the object detection device and the posture recognition device of the information processing system process the video information in real-time. If the posture recognition device recognizes that the posture information the person is the lying posture, the safety recognition device determines that the person may fall down and be in the dangerous state. In this case, the object detection device positions the person and obtain positon information of the person, and transmits the position information to the terminal control system. The image capturing device of the terminal control system obtains the image information indicating a falling down state of the person matched with the position information, and transmits the image information to the mobile phone of the family member of the person through the home WiFi, and the voice broadcasting device output the voice alarming to remind the family member.

When the person is in the stage of person leaving the non-sleeping region 6 and entering a toilet, that is, no person is in the bedroom, the information processing system transmits a voice command information through the home WiFi to the terminal control system to control the terminal lighting fixture to be turned off, thus achieving the effect of saving electricity.

Figure 5:
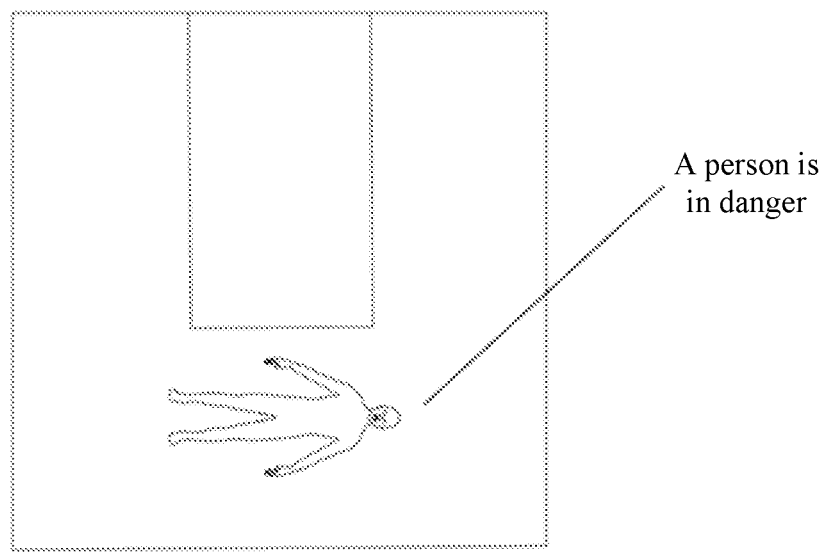
FIG. 5 illustrates a schematic view showing that a person is in danger at night.

When the person is in the stage of person leaving the toilet and entering the non-sleeping region 6, in this case, the object detection device detects that the person appears in the bed room again, the information processing system transmits voice command information to the terminal control system through the home WiFi, to enable the light intensity adjusting device adjusts the terminal lighting fixture to operate in an appropriate mode according to the age group of the person. In this case, the object detection device and the posture recognition device also process the video information in real-time. As shown in FIG. 5, if the posture recognition device recognizes that the posture information the person is the lying posture, the safety recognition device determines that the person may fall down and in the dangerous state, the object detection device positions the person and obtains position information of the person, and sends the position information to the terminal control system. The image capturing device of the terminal control system then obtains the image information indicating a falling down state of the person matched with the position information, and transmits the image information to the mobile phone of the family member of the person through the home WiFi, and the voice broadcasting device outputs a voice alarming to remind the family member.

When the person is in the stage of person leaving the non-sleeping region 6 and entering the sleeping region 5, in this case, the object detection device detects that the person is in the sleeping region 5, if the posture recognition device detects that the posture information the posture is the lying posture, the object detection device and the posture recognition device transmit detection information to the terminal control system, to enable the light intensity adjusting device to control the terminal lighting fixture to be turned off.

Preferably, the voice acquisition device 1 of the present disclosure can acquire voice information of the person, the voice command processing device processes the voice information to obtain voice command information and transmits the instruction to the control terminal control system through the home WiFi, and the terminal control system controls the turned-on and turned-off of the terminal lighting fixture 3. When the light of the terminal lighting fixture 3 is controlled by a voice, the voice information should include keywords related to the operation mode, such as "turn on children illumination mode". In order not to affect the sleeping of other persons, this control manner is more suitable for a situation that single person is in the room.

What is claimed is:

1. A system for nighttime lighting control and danger monitoring and alarming, comprising:
   a data acquisition system, an information processing system, and a terminal control system;
       wherein the data acquisition system is configured to acquire video information in a room and a voice content of a person in the room in real-time, and transmit the video information and the voice content to the information processing system;
       wherein the information processing system is configured to obtain voice command information of the person based on the voice content, obtain age information and safety state information of the person based on the video information, and transmit the voice command information, the age information and the safety state information to the terminal control system; and
       wherein the terminal control system is configured to intelligently control a terminal lighting fixture according to the voice command information and the age information, and perform capturing of an image of the person and voice alarming according to the safety state information.

2. The system for nighttime lighting control and danger monitoring and alarming according to claim 1, wherein the data acquisition system comprises an infrared camera device and a voice acquisition device, the infrared camera device and the voice acquisition device are both arranged at tops of the room, the infrared camera device is configured to obtain the video information in the room in real-time and transmit the video information to the information processing system, and the voice acquisition device is configured to acquire the voice content of the person and transmit the voice content to the information processing system.

3. The system for nighttime lighting control and danger monitoring and alarming according to claim 1, wherein the information processing system comprises an object detection device, a posture recognition device, a voice command processing device, and a safety recognition device;
   wherein the object detection device is configured to detect position information of the person and the age information of the person, determine light intensity level information of the terminal lighting fixture according to the age information of the person, and transmit the light intensity level information to the terminal control system;
   wherein the posture recognition device is configured to recognize posture information of the person, and the posture information comprises one of a lying posture and a non-lying posture, and the non-lying posture comprises one of a sitting posture and a standing posture;
   wherein the voice command processing device is configured to receive the voice content acquired by the voice acquisition device and process the voice content through a deep learning algorithm to obtain the voice command information and thereby perform terminal control; and
   wherein the safety recognition device is configured to obtain the safety state information according to the positon information of the person detected by the object detection device and the posture information of the person recognized by the posture recognition device, and transmit the safety state information to the terminal control system.

4. The system for nighttime lighting control and danger monitoring and alarming according to claim 3, wherein the object detection device is configured to extract a facial region of the person in the room, and estimate an age group to which the person belongs through an open source computer vision library (OpenCV) algorithm based on deep learning as the age information;
   wherein the age group corresponds to one of the following three categories: children group which is smaller than or equal to 15 years old; young and middle-aged group which is between 16 years old and 60 years old, and elderly group which is equal to or more than 61 years old.

5. The system for nighttime lighting control and danger monitoring and alarming according to claim 3, wherein the posture recognition device is configured to recognize the posture information of the person in the room through an OpenCV based skeleton key point algorithm.

6. The system for nighttime lighting control and danger monitoring and alarming according to claim 3, wherein the position information of the person comprises one of a sleeping region and a non-sleeping region;
   where the safety recognition device is configured to obtain the safety state information of the person as follows:
      recognize the person is at a safety state as the safety state information, when the person is in the sleeping region and the posture information of the person is the lying posture;
      recognize the person is at a safety state as the safety state information, when the person is in the sleeping region and the posture information of the person is the non-lying posture;
      recognize the person is at a safety state as the safety state information, when the person is in the non-sleeping region and the posture information of the person is the non-lying posture;
      recognize the person is at a dangerous state as the safety state information, when the person is in the non-sleeping region and the posture information of the person is the lying posture.

7. The system for nighttime lighting control and danger monitoring and alarming according to claim 1, wherein the terminal control system comprises a light intensity adjusting device, an image capturing device, and a voice broadcasting device;
   wherein the light intensity adjusting device is configured to receive the light intensity level information from the information processing system, and control the lighting fixture to be with a corresponding light intensity level according to the light intensity level information;
   wherein the image capturing device is configured to receive the safety state information of the person, perform the capturing of the image of the person in response to the safety state information of the person indicating "the person is in danger", and transmit the captured image to a mobile phone of a family member of the person as a reminder; and
   wherein the voice broadcasting device is configured to receive the voice command information of the person transmitted from the information processing system and respond to the voice command information, and receive the safety state information of the person and perform the voice alarming in response to the safety state information of the person indicating "the person is in danger".

8. The system for nighttime lighting control and danger monitoring and alarming according to claim 7, wherein the light intensity adjusting device has five levels, which comprise: a closed-level, an operated-level corresponding to a light intensity in a range of 50 luxes (LX) to 300 LX, a children-mode-level corresponding to a light intensity greater than 0 and smaller than or equal to 10 LX, a night-standard-mode-level corresponding to a light intensity in a range of 2 LX to 4 LX, and an elderly-mode-level corresponding to a light intensity in a range of 10 LX to 20 LX; and the age information matches with one of the five levels of the light intensity adjusting device.

9. A method for nighttime lighting control and danger monitoring and alarming, comprising:
   S1, acquiring video information in a room and a voice content of a person in the room, obtaining position information, posture information and age information of the person in the room according to the video information, and processing the voice content to obtain voice command information to thereby control a terminal lighting fixture;
   S2, determining light intensity level information of the terminal lighting fixture according to the age information of the person in the room, and controlling a level of the terminal lighting fixture according to the light intensity level information;
   S3, determining whether the person in the room is in a state of getting up in the night to urinate according to the position information and the posture information of the person in the room, wherein the state of getting up in the night to urinate comprises one of the group consisting of: person leaving a sleeping region and entering a non-sleeping region, person leaving a non-sleeping region and entering a toilet, person leaving the toilet and entering the non-sleeping region, and person leaving the non-sleeping region and entering the sleeping region; and S4, determining the person is at a dangerous state in response to the person in the room being in the state of getting up in the night to urinate, the person being in the non-sleeping region and the posture information of the person indicating a lying posture, obtaining an image of the person at the dangerous state and performing voice alarming.

* * * * *